3,122,079
FOCUSING MECHANISM FOR PHOTOGRAPHIC OR CINEMATOGRAPHIC OBJECTIVES
Herbert Mahn, Bad Kreuznach, Germany, assignor to Jos. Schneider & Co. Optische Werke, Bad Kreuznach, Germany, a company of Germany
Filed Dec. 22, 1961, Ser. No. 161,659
Claims priority, application Germany Jan. 14, 1961
5 Claims. (Cl. 95—45)

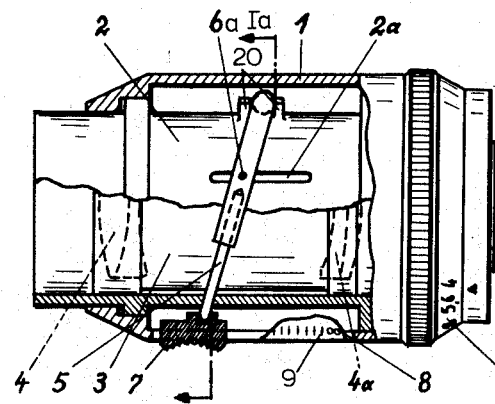

My present invention relates to a photographic or cinematographic camera objective with one or more components (usually including a front lens) that are axially displaceable for focusing purposes.

Conventional focusing means include a rotatable but axially fixed ring threadedly engaging a nonrotatable axially shiftable lens barrel whereby the latter can be advanced or retracted upon rotation of the ring. This mode of adjustment is tedious in the case of objectives of large focal length, such as telephoto objectives, in which a considerable axial shift is needed for adjustment over the entire focusing range of the system.

It is, therefore, an important object of my present invention to provide means for enabling more rapid focusing in a telephoto objective or similar optical system.

It is a more particular objective of this invention to provide means for enabling the focusing adjustment of an objective to be carried out by the axial displacement of a control element.

Another specific object, allied with the preceding one, is to provide means for so connecting an axially displaceable lens support with an axially shiftable control element therefor that the lens support moves at a slower rate than the control element whereby a more convenient scale spread and a more precise adjustment may be realized.

A further object of my invention is to provide means for combining this control element with a diaphragm preselector in such manner that the user can easily, and with one hand, open the diaphragm to its widest aperture while focusing the objective, with subsequent return of the diaphragm to its preselected stop position upon the release of the control element for the focusing means.

In accordance with my instant invention I provide in a photographic or cinematographic camera objective, e.g. one of the telephoto type, a stationary holder and a lens support slidable in the direction of the optical axis of the objective, in combination with axially displaceable control means such as a slider and a lever connection between the holder, the lens support and the control means whereby an axial movement of the latter will result in a proportional, preferably reduced displacement of the lens support. The latter will usually be in the shape of a barrel centered on the objective axis, the holder advantageously comprising a tubular inner housing and a generally cylindrical outer shell coaxially surrounding the lens barrel and provided with peripheral slots to accommodate the articulated connections between the axially shiftable parts and the associated lever means. The latter, in a preferred embodiment, consists of a ring or a ring segment surrounding the inner housing with sufficient clearance and/or deformability to enable its swinging about a fulcrum provided for it on the stationary objective portion, i.e. the housing or the shell. This fulcrum may be fixed or, pursuant to a further feature of my invention, may be axially shiftable to afford different ranges of adjustment. It is to be understood that the term "articulated" as applied to the connections and the ring or ring segment with the slider, the housing and the lens barrel is to be construed broadly as encompassing not only pivotal joints but any position engagement with freedom of relative angular displacement.

Another feature of the invention envisages the insertion of a radially depressible stud or similar actuating element in the focusing slider to act upon the setting ring of a conventional iris diaphragm through the intermediary of another curved member for disengaging a projection on this ring from a co-operating stop on an aperture selector whereby the diaphragm may be opened wide during focusing.

The above and other objects, features and advantages of my invention will become more fully apparent from the following detailed description, reference being made to the accompanying drawing in which:

FIG. 1 is a side-elevational view (parts broken away) of a camera objective embodying the invention;

FIG. 1a is a cross-sectional view taken on the line IA—IA of FIG. 1;

FIG. 2 is a view similar to FIG. 1 illustrating another embodiment of the invention;

FIG. 2a is a cross-sectional view on the line IIA—IIA of FIG. 2; and

FIG. 3 is a cross-sectional view similar to FIGS. 1a and 2a but looking toward the rear of the objective, the system shown therein representing a modification of that illustrated in FIGS. 1 and 1a.

The objective shown in FIGS. 1 and 1a comprises a housing composed of two generally cylindrical portions, i.e. an outer shell 1 and an inner tube 2, the shell 1 having a threaded rearward extension for attaching it to the body of a camera not shown. An iris diaphragm, not shown in these figures but visible at 16 in FIG. 3, is adjustable in the conventional manner with the aid of a rotatable but axially fixed setting ring 1b. The tubular inner housing portion 2 extends coaxially within shell 1 in relatively fixed position and, in turn, encloses a lens barrel 3 which is axially slidable therein. Lens barrel 3 supports the front assembly 4, 4a of a known type of telephoto objective and is provided with a pair of outwardly projecting guide pins 6a, 6b which pass through peripheral slots 2a, 2b in housing cylinder 2. The slots 2a and 2b, here shown to be straight and parallel to the optical axis although this need not be exactly the case, are disposed on opposite sides of a pair of lugs 20 which rise from cylinder 2 and form a fulcrum for an annular lever composed of a substantially semicircular bottom segment 5 and a complementary top segment 5a, the latter being received between the lugs 20 and swingable about the aligned pins 6a, 6b while telescopically receiving the ends of segment 5 to enable a change in the circumference of the member 5, 5a as it swings about its pivotal axis. It will be noted that segment 5a is guided by lugs 20 between housing portions 1 and 2 with enough clearance to enable a full swing from the position shown in FIG. 1 into an oppositely inclined position, yet it will of course be possible to give the slots 2a, 2b a slight upward concavity if necessary.

Shell 1 also has an axially extending peripheral slot 8 in which a slider 7 is manually displaceable; this slider hingedly grips the ring segment 5 whereby the composite member 5, 5a acts as a lever to translate any linear displacement of the slider into a similar but reduced displacement of the lens barrel 3. Slider 7 carries a pointer 7a which co-operates with the pin 9 alongside slot 8, the scale being graduated in units of distance which may range from, say, one meter (or about three feet) at the left-hand end thereof, as viewed in FIG. 1, to infinity at the right-hand end. It will thus be seen that a major part of the length of the objective housing is available for the display of the scale markings whereas the extent of the actual displacement stroke of the lens barrel 3 is substantially less as evidenced by the reduced length of the slot 2a in FIG. 1.

The system of FIGS. 2 and 2a, in which elements similar to those of the preceding embodiment have been designated by the same reference characters supplemented by a prime ('), is designed to afford an increased displacement stroke for the lens barrel relative to the length of its housing. In this embodiment the lugs 20 of FIGS. 1 and 1a have been omitted and the fulcrum for the focusing lever is here provided by a second slider 10 diametrically opposite slider 7'. Slider 10 is guided in a peripheral slot 8a' of shell 1' opposite the slot 8'; the lever here consists of a lower segment 5', two short tubular segments 5a', 5b' respectively bearing the pins 6a' and 6b', and an upper segment 5c' gripped by the slider 10. The nearly semiannular segments 5' and 5c' are telescopically received in the tubular segments 5a', 5b' to facilitate the necessary adjustment of the circumference of the loop defined by these segments. Slider 10 also carries a detent spring 11 adapted to be releasably indexed in several notches 12 of shell 1'; a second scale 8a', swept by a pointer 10a of slider 10, supplements the scale 9' co-operating with the pointer 7a' of slider 7'.

The objective shown in FIGS. 2 and 2a can thus be readily focused in coarse steps by a shifting of slider 10 from one notch 12 to another, a fine or vernier adjustment being then possible by a suitable displacement of slider 7'.

In FIG. 3, wherein elements previously identified have been given identical reference characters followed by a double prime ("), the focusing lever has been shown as a flexible semicircular ring segment 5" having one end fulcrumed on housing portion 2" at 20" and having its other end pivotally hinged or otherwise articulated to slider 7". This slider is shown provided with a manually depressible stud 13 adapted to act upon a curved lever arm 14 which is pivoted to slider 7" at 14a; a spring 15 tends to swing the arms 14 outwardly about its pivot 14a. The free end of arm 14 extends toward a location diametrically opposite the pivot pin 6" of lever 5" and terminates in the vicinity of a projection 16b rigid with the setting 16a of iris diaphragm 16. Projection 16b extends axially within the annular space between shell 1" and cylinder 2" for a sufficient distance to remain aligned with the end of arm 14 in every position of slider 7". Shell 1" has an arcuate slot 22 within which a diaphragm preselector 17 is limitedly movable in circumferential direction so as to be frictionally or otherwise retained in any selected position of adjustment; a stop 17a on member 17 coacts with projection 16b to arrest the setting ring 26a in the selected position into which it is urged by a spring 21 anchored to cylinder 2".

When the user depresses the stud 13, projection 16b is disengaged from stop 17a by the pressure of arm 14, against the forces of springs 15 and 21, and is rotated clockwise within the limits of a cutout 23 in housing 2" to adjust the diaphragm 16 to wide-open position. Slider 7" may now be displaced longitudinally into a position in which the camera is accurately focused upon an object as determined, for example, on a reflex-type viewfinder or on a ground-glass plate substituted for the film holder of a camera. With the release of slider 7" and stud 13 the diaphragm assumes its preselected aperture and the objective is ready for picture taking.

The system herein disclosed can be used, advantageously, with a depth-of-field indicator of the type described and illustrated in my copending application of even date entitled "Depth-of-Field-Indicator for Optical Objective With Axially Shiftable Focusing Means," Ser. No. 161,658.

Various modifications of the details of construction shown in the drawing are, of course, possible without departing from the spirit and scope of the invention as defined in the appended claims.

I claim:

1. A camera objective comprising a stationary holder, a lens support slidable on said holder in the direction of the objective axis, control means movable on said holder in the direction of said axis, lever means on said holder articulated at spaced-apart locations to said control means and to said support, and anchor means on said holder forming a fulcrum for said lever means whereby an axial displacement of said control means produces a proportional axial displacement of said support; said control means comprising a first slider, said anchor means comprising a second slider displaceable parallel to said first slider at a substantially diametrically opposite location and provided with indexing means for releasably retaining said second slider in a selected axial position.

2. A camera objective comprising a tubular housing provided with at least one peripheral slot extending generally in the direction of the tube axis, a lens support axially slidable in said housing, control means movable on said housing in the direction of said axis, arcuate lever means curved around said housing and provided with pivot means extending through said slot into engagement with said support, said lever means being articulated to said control means at a location remote from said pivot means, anchor means on said housing forming a fulcrum for said lever means whereby an axial displacement of said control means outside said housing produces a proportional axial displacement of said support inside said housing; an adjustable diaphragm in said housing, angularly displaceable stop means on said housing selectively presettable in different positions of adjustment, setting means for said diaphragm provided with a projection extending outwardly toward said stop means for coaction therewith, spring means coupled with said projection for urging it into contact with said stop means, and actuating means on said control means provided with an extension displaceable into temporary engagement with said projection for deflecting it from contact with said stop means and adjusting said diaphragm to a wide-open position against the force of said spring means.

3. An objective according to claim 2 wherein said lever means is of substantially annular configuration.

4. A camera objective comprising a generally cylindrical outer shell provided with at least one peripheral first slot parallel to the objective axis, a tubular housing portion coaxially positioned within said shell and provided with at least one peripheral second slot generally parallel to said axis, a lens barrel coaxial with said housing portion and axially slidable therein, a slider axially movable on said shell along said first slot, arcuate lever means curved around said housing portion within said shell and provided with pivot means extending through said second slot into engagement with said lens barrel, said lever means being hinged to said slider at a location remote from said pivot means, and anchor means between said shell and said housing portion forming a fulcrum for said lever means whereby an axial displacement of said slider produces a proportional axial displacement of said lens barrel, said shell being provided with another peripheral slot parallel to and substantially diametrically opposite said first slot, said anchor means comprising another slider displaceable on said shell along said other slot and provided with indexing means for releasably retaining it in a selected axial position.

5. A camera objective comprising a generally cylindrical outer shell provided with at least one peripheral first slot parallel to the objective axis, a tubular housing portion coaxially positioned within said shell and provided with at least one peripheral second slot generally parallel to said axis, a lens barrel coaxial with said housing portion and axially slidable therein, a slider axially movable on said shell along said first slot, arcuate lever means curved around said housing portion within said shell and provided with pivot means extending through said second slot into engagement with said lens barrel, said lever means being hinged to said slider at a location remote from said pivot means, anchor means between said shell and said housing portion forming a fulcrum for said lever means whereby an axial displacement of said slider produces a proportional axial displacement of said lens barrel, an adjustable diaphragm in said housing portion, angularly displaceable stop means carried on said shell, said stop means being selectively presettable in different positions of adjustment, a setting ring for said diaphragm rotatable about said axis and provided with a projection extending outwardly toward said stop means for coaction therewith, spring means coupled with said ring and housing for urging said projection into contact with said stop means, a button on said slider radially depressible thereon, and a curved actuating element extending from said button around part of said housing portion toward said projection for deflecting it from contact with said stop means and adjusting said diaphragm to a wide-open position against the action of said stop means.

References Cited in the file of this patent
UNITED STATES PATENTS
2,259,415    Eddy _____ Oct. 14, 1941